United States Patent [19]

Eissenberg et al.

[11] Patent Number: 5,193,568
[45] Date of Patent: Mar. 16, 1993

[54] NONINVASIVE VALVE MONITOR USING ALTERNATING ELECTROMAGNETIC FIELD

[75] Inventors: David M. Eissenberg, Oak Ridge; Howard D. Haynes; Donald A. Casada, both of Knoxville, all of Tenn.

[73] Assignee: Martin Marietta Energy Systems, Inc., Oak Ridge, Tenn.

[21] Appl. No.: 718,453

[22] Filed: Jun. 20, 1991

[51] Int. Cl.$^5$ ............................................. F16K 37/00
[52] U.S. Cl. ...................................... 137/1; 137/554; 324/207.2; 340/686
[58] Field of Search .................. 137/554, 1; 324/207.2; 340/686

[56] References Cited

U.S. PATENT DOCUMENTS

| | | | |
|---|---|---|---|
| 3,017,621 | 1/1962 | Taborsky | 340/282 |
| 3,162,805 | 12/1964 | Robertson | 324/207.2 |
| 3,522,596 | 8/1970 | Fowler et al. | 340/238 |
| 3,602,254 | 8/1971 | Fawkes | 137/554 |
| 3,857,277 | 12/1974 | Moore | 73/28 |
| 3,859,619 | 1/1975 | Ishihara et al. | 340/238 |
| 4,086,519 | 4/1978 | Persson | 318/254 |
| 4,601,211 | 7/1986 | Whistler | 137/554 |
| 4,618,824 | 10/1986 | Magee et al. | 324/208 |
| 4,777,979 | 10/1988 | Twerdochlib | 137/554 |
| 4,825,157 | 4/1989 | Mikan | 324/208 |
| 5,002,090 | 3/1991 | Ichikawa | 137/550 |
| 5,008,841 | 4/1991 | McElroy | 340/686 |
| 5,086,273 | 2/1992 | Leon | 116/277 |

FOREIGN PATENT DOCUMENTS 2095407  9/1982  United Kingdom .

OTHER PUBLICATIONS

The Theory of Electromagnetic Flow-Measurement by J. A. Shercliff (1962).
(Liberty Attachment 1) Notebook entries from Liberty Technologies, pp. 97–99, 107–109.
(Liberty Attachment 2) Patent application without claims, "System for Determining Position of an Internal, Movable Conductive Element,".
(Liberty Attachment 3) U.S. patent application with claims, "A Non-Invasive System and Method for Inspection of Valves," Liberty File: MCEL-1.

Primary Examiner—A. Michael Chambers
Attorney, Agent, or Firm—James M. Spicer; Harold W. Adams

[57] ABSTRACT

One or more electrical coils are carefully located on the outside of a valve body. An alternating current passing through the coil(s) results in an alternating electromagnetic field being transmitted into the valve body and valve internals. The electromagnetic field varies in intensity and polarity in the valve. As the position of a valve internal part is changed, the electromagnetic field throughout the valve body and its internals is altered. A passive receiver coil carefully located on the outside of the valve body detects the intensity of the electromagnetic field at that location as an induced electrical voltage in the coil. With the change in position of the valve internal part, there is a corresponding change in the induced voltage as a result of the alteration in the alternating electromagnetic field at that location. Changes in the voltage provide an indication of the position and motion of valve internals.

36 Claims, 5 Drawing Sheets

NONINVASIVE VALVE MONITOR USING ALTERNATING ELECTROMAGNETIC FIELD

This invention was made with Government support under contract no. DE-AC05-840R21400 awarded by the Department of Energy. The Government has certain rights in this invention.

Reference is made to related application entitled "Noninvasive Valve Monitor Using Constant Magnetic and/or DC Electromagnetic Field", commonly assigned Ser. No. 718,058, filed Jun. 20, 1991.

BACKGROUND OF THE INVENTION

1. Field of the Invention

The invention relates to monitors for determination of the condition of operating valves, and more particularly to systems such as those which monitor external to the valve.

Check valves are used extensively within nuclear power plants for the purpose of controlling the direction of fluid flow. The function of a check valve is to permit flow in only one direction. When the flow stops or reverses direction, the check valve should close immediately in order to prevent backflow.

Check valve failures have led to water hammers, overpressurization of low-pressure systems, and damage to flow system components. Degradation and wear of check valve internal components have contributed substantially to the number and severity of check valve failures. Principal causes of internal component wear are vibrations and oscillations (instability) of check valve obturators under flow conditions that do not fully open the check valve. Obturator instability may be a result of misapplication (using oversized valves) and exacerbated by low flow conditions and/or upstream flow disturbances.

A recent Significant Operating Experience Report distributed by the Institute of Nuclear Power Operations (INPO) recommends that nuclear power plants establish a preventive maintenance program to ensure check valve reliability. The program should include periodic testing, surveillance monitoring, and disassembly and inspection. A nuclear utility is thus motivated to determine which check valves are operating in an unstable or degraded condition.

Therefore a need exists for a method and device for positively determining the position and motion of a check valve obturator during plant operation. Those valves which are identified as unstable or degraded can then be disassembled more frequently which should reduce the number of failures which result from internal component wear.

Furthermore, those valves which are in satisfactory condition need not be disassembled. Avoidance of unnecessary disassembly minimizes costs, the potential for damaging the valve during disassembly or reassembly, improper reassembly, spread of radioactive contamination and radiation exposure to personnel, outage durations, and the potential for improper system restoration.

2. Description of the Prior Art

Several developmental and/or commercially available check valve monitors, particularly those based on measurements of acoustic emission, ultrasonics, radiography, and magnetic flux are described and discussed in a recent U.S. Nuclear Regulatory Commission report. The report, NUREG/CR-4302, Volume 2, also ORNL 6193/V2, is available from National Technical Information Service, Springfield, Virginia 22161, and is incorporated herein by reference.

SUMMARY OF THE INVENTION

In contrast to the prior art, the present invention is based on attaching one or more transmitter coils to the outside of a valve body at key locations. When an electric current is passed through the coil(s), a localized alternating electromagnetic field is generated within the valve body and valve internals. The electromagnetic field varies in intensity and polarity in accordance with location. When the position of a valve internal part is changed, the electromagnetic field throughout the valve body and its internals will be altered. A passive receiver coil, attached to the outside of the valve body at an appropriate location, detects the intensity of the electromagnetic field at that location as an induced electrical voltage signal in the coil at the same frequency as that transmitted by the transmitter coil. With the change in position of the valve internal part, there is a corresponding change in the amplitude of the induced voltage as a result of the alteration in the alternating electromagnetic field at that location.

DETAILED DESCRIPTION OF THE INVENTION AND PREFERRED EMBODIMENTS

Figure 1:
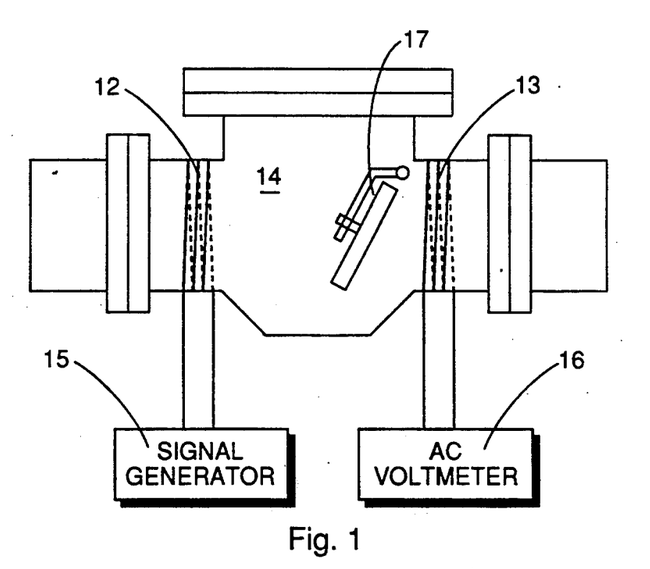
FIG. 1 is a cross-sectional, schematic view of a check valve embodying the multiturn transmitter coil/receiver coil monitor of the present invention.

In FIG. 1, a transmitter coil 12 and a receiver coil 13 are located at different external positions on the body of a valve 14.

The coils 12, 13 are multiturn coils wrapped around or placed against the valve body, or they may be any of several other configurations described later. A signal generator 15 connected to transmitter coil 12 drives the coil 12 with a certain amount of current at a preselected frequency. This current, passing through transmitter coil 12, causes an alternating electromagnetic field to be generated that radiates from the coil 12, particularly into the valve 14.

The receiver coil 13 detects any local magnetic field. In this invention, the alternating electromagnetic field from the transmitter coil 12 reaches the receiver coil 13 where it causes a detectable alternating voltage signal to be produced across the leads of coil 13. Necessary to the invention is the studied placement of the coils 12, 13 on the valve body to ensure that the alternating electromagnetic field passes through the valve in a desired manner before it reaches the receiver coil 13.

This being done, the alternating electromagnetic field is altered, i.e., distorted, as a result of its interaction with the valve body and/or valve internals. Now altered and attenuated, the alternating electromagnetic field nevertheless is still easily detectable by the receiver coil. It will be noted that although altered, the field is still at the originally transmitted frequency. The alternating voltage signal can be monitored directly by any of several means such as an ac voltmeter 16, for example.

It will be understood from the foregoing that when the obturator 17 of the valve 14 is located at a particular position, there will be a particular transmission of alternating electromagnetic field from coil 12 across and/or through the valve to the other coil 13, and an alternating voltage signal is observable at the ac voltmeter 16. When the obturator 17 is at a different position, even momentarily, a small but noticeable change in the alternating electromagnetic field transmission occurs as a result, and a small change in the alternating voltage signal at the ac voltmeter 16 is observable.

A series of improvements may be made to the basic invention of FIG. 1. The first of these is signal conditioning electronics added to provide a more powerful input signal and a stronger output signal.

Figure 2:
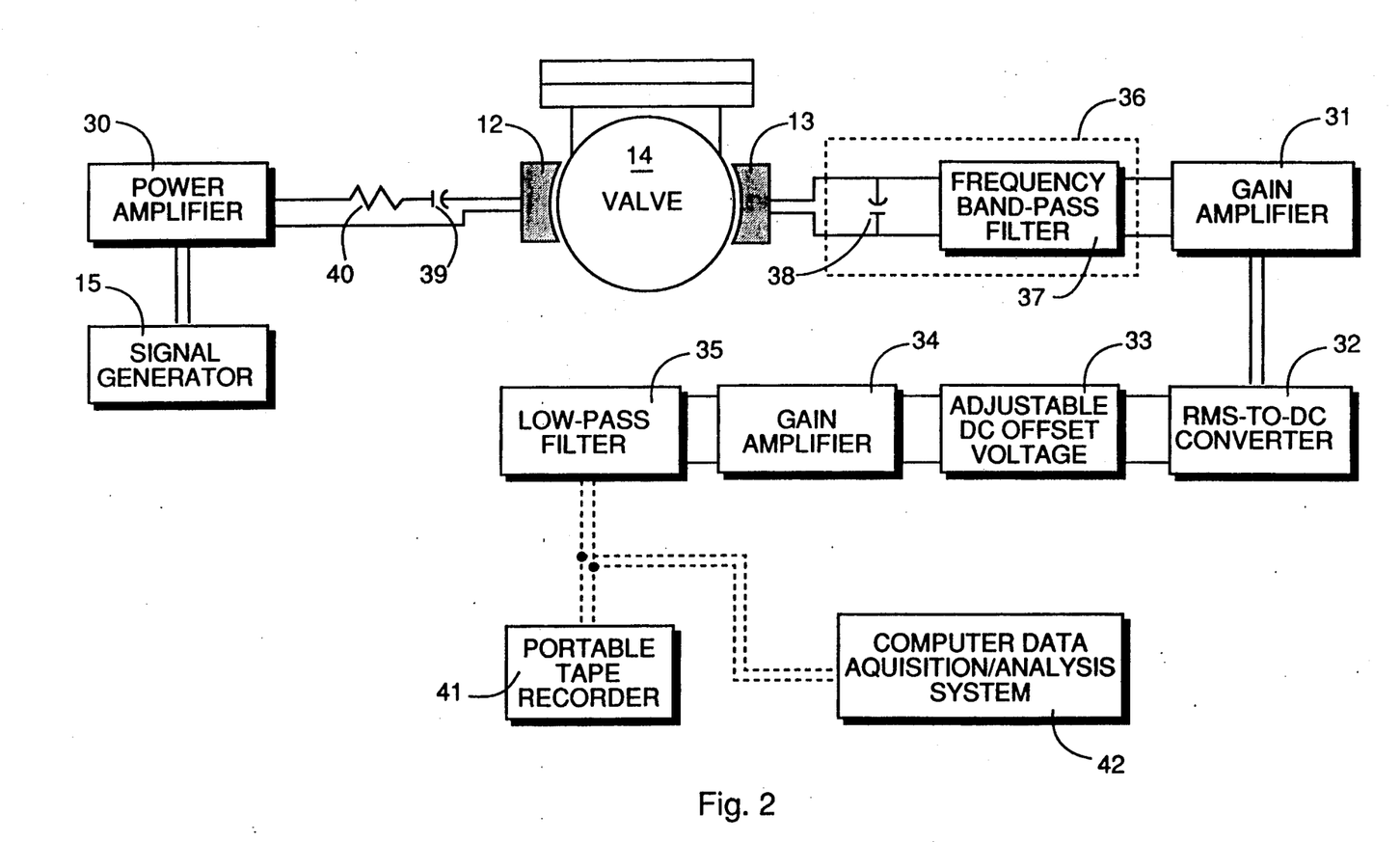
FIG. 2 is a schematic diagram of operating circuitry useful in various embodiments of the invention.

FIG. 2 illustrates the signal generator 15 with its output put through a power amplifier 30 resulting in more current through the transmitter coil 12, far more than with the signal generator alone. The higher current through coil 12 produces a larger alternating electromagnetic field and results in a larger signal at the receiver coil 13.

The receiver coil 13 signal is amplified by a gain amplifier 31. An rms-to-dc converter 32 converts the amplified ac voltage signal to a dc signal whose amplitude reflects the amplitude of the ac signal. The dc signal is usually easier to interpret in terms of its amplitude changes than its ac counterpart. It is also useful to use an offsetting dc voltage 33 to bring the dc signal to 0 volts for some measurements such as when the valve is in a rest position, for example. Another amplifier 34 provides further amplification useful to bring the output signal up to the $\frac{1}{2}$- 1 volt level, a level easily recorded by a recording instrument such as a portable tape recorder 41. Finally, the amplified and offset dc signal may be put through a low pass filter 35 to eliminate any other unwanted electronic circuit noise and provide a smoother signal.

As with the FIG. 1 embodiment, some means of monitoring the alternating voltage signal out of filter 35 is needed. A variety of signal analyzing means are known in the instrumentation field and not described here except generally. By way of example, the alternating voltage signal could be digitized and analyzed in the time domain or frequency domain. Fluttering of a check valve disc has been analyzed in the frequency domain.

Experimentation has shown that different coil geometries may be used for both the transmitter coil 12 and receiver coil 13. One can vary the geometry of both the transmitter and receiver coils, and the coils do not necessarily have to have the same geometry. For example, a wraparound may be used for one coil and a hold-in-your-hand portable coil could be used for the other coil.

The method of wrapping the coils 12, 13 around the valve body might be preferred if the coils were to be left permanently in place. Depending on the application, different coils such as cylindrical solenoid coils directly from solenoid valves, for instance, could be used. Other coil shapes that the user might want to use could include pancake types, flat coils, or solenoid coils. Semicircular or other shapes could be used. The coil shapes most used to date have been the wrapped coils and cylindrical solenoid coils, both with and without inserted core materials.

Wrapped coils need to be insulated from each other. Wires having an enameled coating may be preferred to the thicker plastic coated wires because the coils wrap tighter resulting in more turns within the same volume.

For wrapped coils, it is possible to wrap once or twice around the valve and have effectively wrapped the same wire around the valve many times. This can be achieved, for example, with ribbon cables having their connectors arranged such that when the connection is made, all of the wire segments become connected in series rather than in parallel. Thus it is possible to produce several wire wraps around the valve by connecting a ribbon cable only once around the valve.

Coils have been attached by epoxying the coils directly on the valves, or, a connection point such as a nut or stud can be affixed to the valve and the coil attached to the connection point. If a nut is epoxied on the valve, wire can be wrapped around a bolt so that the core of the coil is a bolt. The bolt is then screwed onto the epoxied nut. The coils may also be held on the valve by means of a belt or a strap. Also, on some valves, the coil could be provided with a small magnet so the coil would stick on the valve.

The coils do not have to touch the valve body. However, when the coils are positioned further from the valve body, for example, a penalty in signal to noise ratio is paid. This might be practical if the valve is insulated.

Since an electromagnetic field is generated with the transmitter coil, and a voltage is induced in the receiver coil from the electromagnetic field, the number of coil turns in each coil is another variable in the invention. The more turns used, generally the more electromagnetic field is generated per unit of current in the transmitter coil, and likewise the more voltage will be induced in the receiver coil from the electromagnetic field.

In solenoid coils, different core materials were tried and some worked better than others in effectively transmitting and receiving the electromagnetic field. In one test using small solenoid coils for both the transmitter and receiver coils, twenty or so small ferromagnetic steel rods were placed axially within the core of each coil. This resulted in a very significant increase in the system signal-to-noise ratio, that is, the rods were found to be very effective in enhancing the transmission and reception of the alternating electromagnetic fields. It appears that the rods provide a more efficient coupling of the solenoid coil fields to the valve body. A single ferrite core can also be used.

In a typical vendor-supplied electromagnet, the north and south poles are usually in close proximity to each other as, for example, in a horseshoe configuration. There is strong interaction between the poles so as to attract a piece of metal placed between them more efficiently than if just one of those poles is used to pick up the piece. This aspect of electromagnets was not found to be useful in the invention. Instead, it is preferable to separate the poles from one another to reduce the "short circuiting" of the field caused by the poles being close to each other. If one pole is placed at the valve, the opposite pole should be directed away from the valve. If possible, the opposite pole should be extended far away from the valve. When this is done, the electromagnetic field is more efficiently transmitted into the valve body. The extended pole reduces the short circuit effect of close poles, making more efficient use of the available field and achieving a better transmission to the valve from the transmitting coil, and a better reception from the receiving coil.

Some other signal conditioning has been discovered that considerably improves the overall signal-to-noise ratio. The most effective is the use of a receiver coil tuning circuit 36. This may be either a frequency bandpass filter 37 connecting the receiver coil 13 with the gain amplifier 31, or a capacitor 38 in parallel with the coil 13 and amplifier 31. Preferably, the filter 37 and capacitor 38 are used together. The filter 37 removes frequencies other than that which is generated by the signal generator 15. The capacitor 38 is selected such that the circuit made up by the receiver coil 13 and capacitor 38 have a resonance point at the transmitter coil frequency. This enhances the reception of the transmitted frequency while minimizing the reception of other, extraneous signals such as those coming from motors, etc.

Figure 3:
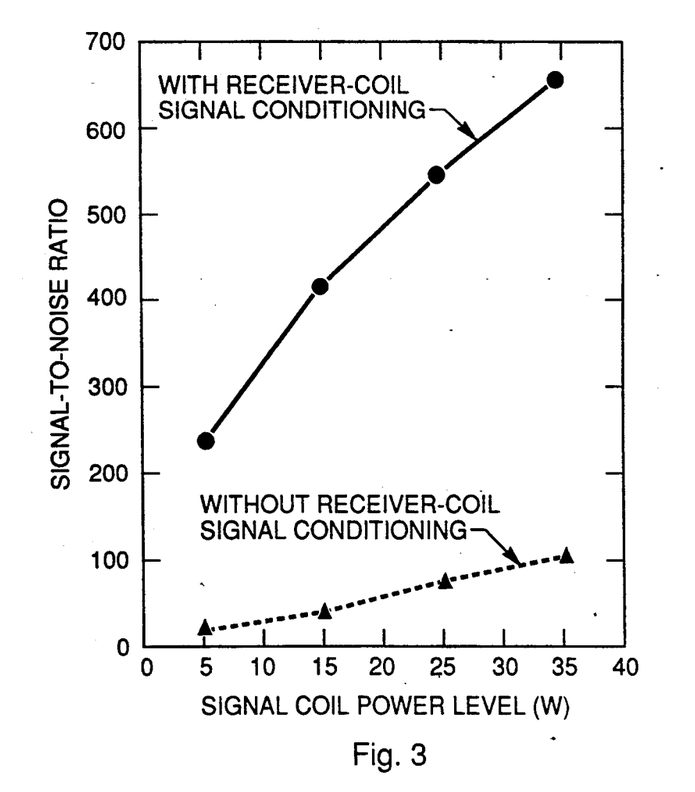
FIG. 3 is a graph for two cases showing the impact of special signal conditioning on the signal-to-noise ratio.

FIG. 3 shows the effect of the receiver coil tuning circuit 36 on signal-to-noise ratio. Shown is the signal-to-noise ratio versus signal coil power level for two cases. The added receiver coil signal conditioning is seen to produce a marked increase in the signal-to-noise ratio for each power level. Also, in both cases, as the signal power level is increased and the electromagnetic field generated by the coil 12 increases, the signal-to-noise ratio is seen to increase as well.

In the transmitter coil circuit (FIG. 2) a capacitor 39 can be used. It connects the power amplifier 30 with the transmitter coil 12. The addition of the capacitor 39 to the circuit produces a tuned transmitter circuit which minimizes the circuit impedance to signals at the resonant (transmitter coil) frequency. This results in the maximum current through the circuit which, in turn, creates the maximum magnetic field strength for the applied voltage.

The last element is an impedance matching resistor 40 in series with the transmitter coil 12. It adds sufficient resistance to current flow in the transmitter circuit to prevent current damage to the signal generator 15 or power amplifier 30.

Figure 4:
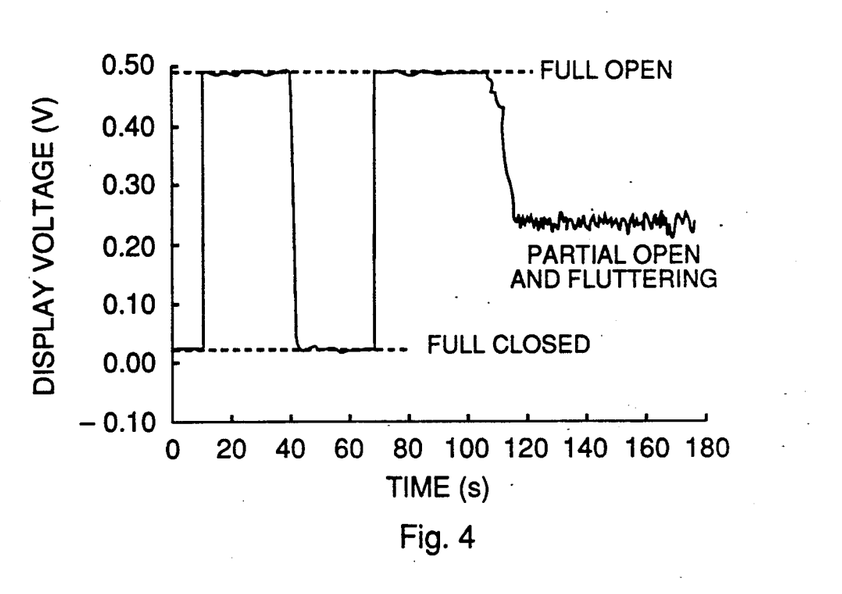
FIG. 4 is a trace of the invention monitoring a 3-inch swing check valve installed in a flow loop.

FIG. 4 shows a trace obtained with the invention monitoring a 3-inch swing check valve installed in a flow loop. The full open and full close positions of the check valve are easily observable, as is the obturator partially open and fluttering condition. Very small amounts of fluttering are detected.

Figure 5:
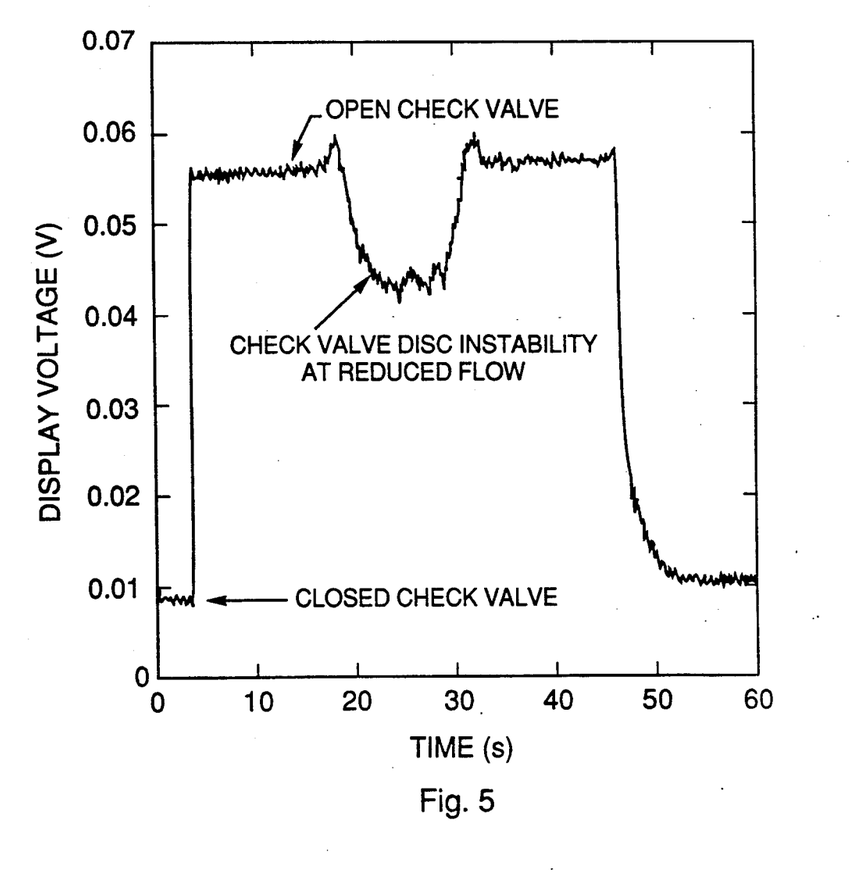
FIG. 5 is a trace of the invention monitoring check valve disc instability at reduced flow.

FIG. 5 is a similar trace, this time illustrating check valve disc instability at reduced flow.

In most of the tests to date, the transmitter and receiver coils were wrapped on the valve body, usually adjacent the valve flange, around the bonnet, or around the adjacent piping. Different coil configurations (locations and types) have been used, however.

Figure 6:
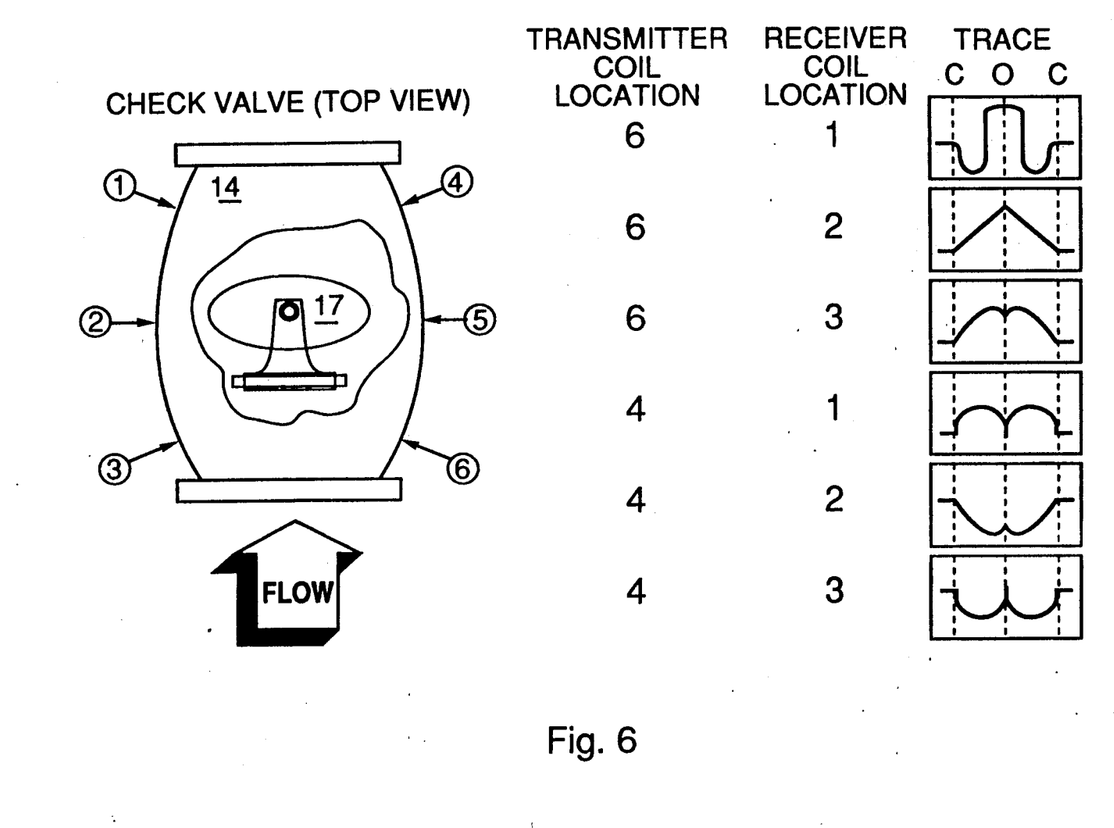
FIG. 6 shows six different characteristic signal shapes (signatures) which can be obtained with selective transmitter coil and receiver coil locations on the body of a check valve.

FIG. 6 shows the effect of different valve locations on the detected signal. In each of the six cases shown, the location of the transmitter coil and the receiver coil is indicated. The six traces were developed by moving the valve disc 17 through its full stroke, from a fully closed position to a fully open back to fully closed as indicated by the C, O, C labels on top of the traces. Thus, the different coil locations not only affect the overall signal change that one sees when the disc 17 moves, but also the characteristic shape, or signature, of the signal observed when the disc moves from one end of its stroke to the other.

Again in FIG. 6, by positioning the two coils in certain locations, one can achieve a linear relationship between the output signal and the disc 17 position from its fully closed to its fully open position (second trace). Other locations such as the third trace produce a signal that varies nonlinearly, for example, reaching a peak signal amplitude at some midstroke valve position. The inventors refer to this nonlinear signature shape as a "humpback" shape. The different shapes result from simply moving one or more coils to different positions.

There are some instances where such a nonlinear signal would be more appropriate than a linear signal, i.e., to achieve a faster changing signal at a certain disc position in a stroke, possibly at midstroke, near the top of the valve, near the bottom of the valve, or any other desired effect.

One signature shape can be used in combination with one or more of the other signals in the same measurement. That is, two or more signals would be used simultaneously because each conveys different information. For example, one signal could be linear across the full range, the other more sensitive at one position versus another. The two together could convey more or better information than just one by itself.

There are still other effects which can act as variables in the invention.

There appears to be a very noticeable difference in the optimum frequency used with different valves. High frequencies of a few hundred hertz, for example, work far better than low frequencies for nonmagnetic-bodied valves such as brass, some stainless steels, etc. With magnetic-bodied valves such as carbon steel, soft iron, etc, lower frequencies work better.

The frequency from the signal generator 15 affects the signal characteristics. One discovery was that given the coils 12, 13 in fixed positions on the valve, varying the frequency to the transmitting coil 12 for various disc positions increased or decreased the output signal. In other words, on certain valves, some frequencies work better than others in providing an increased output signal for changing disc positions. A user might select the frequency based on the type of valve being monitored, or where the coils are located, etc.

In addition, the signal from signal generator 15 can vary in waveform. It can be a fixed frequency such as a sine wave of a fixed discrete frequency, a square wave, etc. Frequencies may be combined such as use of more than one discrete frequency, or broadband or random noise can be used. When the transmitted electromagnetic field involves a broadband frequency, the receiver coil signal can be filtered according to particular bands, with selective attenuation of the unwanted frequency bands.

One significant discovery was that in addition to being able to get a different signature shape by changing the position of the coils, the same sort of effect in the output signal could be obtained by simply varying the frequency to the transmitting coil 12. In other words, if the coils are left at a fixed position, then simply varying the input frequency may result in achieving a linear or nonlinear signal much the same as if the coils were moved to a new position.

Figure 7:
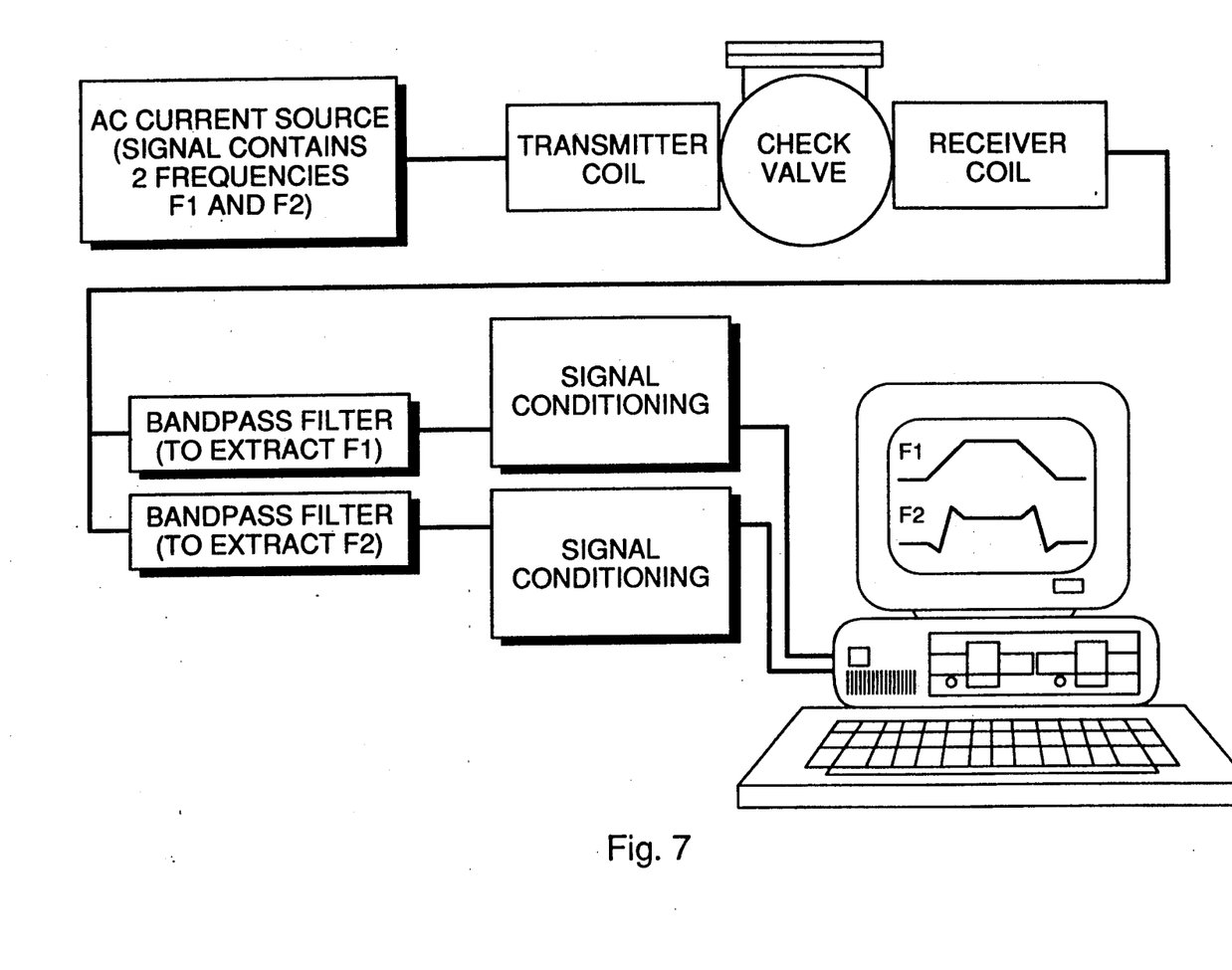
FIG. 7 is a schematic block diagram illustrating one embodiment of the invention that uses two frequencies to generate two output diagnostic signals (linear and humpback) simultaneously.

FIG. 7 shows a still further embodiment. Two or more frequencies are simultaneously provided to the transmitting coil 12. One receiver coil is used with two separate parallel circuits that filter the received signal according to the two input frequencies. By this means, two different signatures (linear, nonlinear, etc.) are provided using one transmitting coil and one receiver coil.

There could also be two or more receiver coils, each having its own bandpass filtering and separate circuit. The one transmitter coil would generate two frequencies as before.

Similarly, there can be two or more transmitter coils, each having its own signal generator and separate circuit. The one receiver coil would receive and process two frequencies as before, or two receiver coils could be used.

Two transmitter coils that are excited at one frequency but with opposite ac phase generation can be used to produce a larger signal for detection. The first transmitter coil may be positioned, for example, at the full close location, and the other transmitter coil at the full open location. The single receiver coil picks up both transmitted signals all of the time, and the relative strength of the two received signals depends on the position of the valve obturator. If the obturator is near the full close position, the receiver coil picks up that phase signal more strongly than the other. When the obturator is near the full open position, the receiver coil picks up the other phase signal strongly.

With such an arrangement of transmitter coils, there results a larger change in the root mean square (rms) of the received signal compared to the single transmitter coil arrangement. Even further enhancement in the root mean square of the detected ac signal is had by making the signal from one transmitter coil stronger than the other.

The invention thus improves on the prior art as follows: Tests have demonstrated that the position and motion of a swing check valve disc assembly can be monitored in real time and on a continuous basis by using the apparatus and methods described herein. It provides the first simple, totally nonintrusive diagnostic monitor for determining valve operability and wear. It accuratel and totally nonintrusively detects the instantaneous position and motions of valve internals such as the discs used as obturators to allow and block flow through check valves. The monitor provides a continuous positive indication of valve disc position from full open to full closed. The monitor facilitates determinations such a whether and to what extent the moving parts of valves have become degraded, the magnitude of the degradation, and whether it is becoming worse with time. The monitor also detects maloperation of the valve, or operating conditions such as disc fluttering that if allowed to continue would result in accelerated valve degradation. The monitor has been demonstrated to work with magnetic and carbon steel valves, as well as stainless steel and nonmagnetic metals such as brass. It works equally well when the working fluid is water, steam, or air. The monitor provides a continuous visual display as well as a written record of the disc location and motion. It is not necessary to open the valve or even stop operations to install and calibrate the monitor.

While there has been shown and described what are at present considered the preferred embodiments of the invention, it will be obvious to those skilled in the art that various changes and modifications can be made therein without departing from the scope of the invention defined by the appended claims.

We claim:

1. A method for monitoring a valve having an obturator mounted within a valve housing and being movable therein between open and closed positions, the method comprising:
    positioning at least one transmitter coil exterior of said valve housing;
    providing an alternating current at a selected frequency to said transmitter coil so tat said transmitter coil produces an alternating electromagnetic field which penetrates into said valve housing; and
    positioning at least one passive receiver coil exterior of said valve housing such that said receiver coil is within the influence of said alternating electromagnetic field, said alternating electromagnetic field inducing an electrical voltage in said receiver coil which varies in accordance with variations in the position of the obturator.

2. A monitor for a valve having an obturator mounted within a valve housing and being movable therein between open and closed positions, the monitor comprising:
    at least one transmitter coil situated external to said valve housing;
    a signal generator providing an alternating current at a selected frequency to said transmitter coil so that said transmitter coil produces an alternating electromagnetic field, said alternating electromagnetic field extending into said valve housing, and said obturator being movable through said electromagnetic field; and
    at least one passive receiver coil disposed external to said valve housing, situated such that said receiver coil is within the influence of said alternating electromagnetic field, said receiver coil producing an alternating voltage signal which varies in accordance with variations in the position of the obturator.

3. The monitor of claim 2 further including means coupled to said passive receiver coil for detecting said alternating voltage signal.

4. The monitor of claim 3 wherein said means for detecting said alternating voltage signal is an ac voltmeter.

5. The monitor of claim 3 wherein said selected frequency involves at least two frequencies.

6. The monitor of claim 5 wherein said means for detecting said alternating voltage signal involves separate means for detecting said two frequencies.

7. The monitor of claim 5 wherein said at least one receiver coil comprises separate receiver coils for each of said two frequencies, and wherein said means for detecting said alternating voltage signal involves separate means for detecting said frequencies from said separate receiver coils.

8. The monitor of claim 5 wherein said at least one transmitter coil comprises separate transmitter coils for producing said alternating electromagnetic field from said two frequency signals.

9. The monitor of claim 2 further including a power amplifier connecting said signal generator to said transmitter coil.

10. The monitor of claim 9 further including a receiver coil tuning circuit connected to said receiver coil.

11. The monitor of claim 10 wherein said receiver coil tuning circuit includes a capacitor connected in parallel with said receiver coil.

12. The monitor of claim 10 wherein said receiver coil tuning circuit includes a frequency band-pass filter connected to said receiver coil.

13. The monitor of claim 10 wherein said receiver coil tuning circuit includes a frequency band-pass filter and a parallel-connected capacitor.

14. The monitor of claim 9 further including a transmitter coil tuning circuit connecting said power amplifier to said transmitter coil.

15. The monitor of claim 14 wherein said transmitter coil tuning circuit includes a capacitor connecting said power amplifier to said transmitter coil.

16. The monitor of claim 9 further including a gain amplifier connected to said receiver coil for amplifying said alternating voltage signal.

17. The monitor of claim 16 further including a means connected to said gain amplifier for converting said amplified alternating voltage signal to a dc signal.

18. The monitor of claim 17 wherein said converting means is an rms-to-dc converter.

19. The monitor of claim 7 further including a dc voltage offsetting source connected to said converting means for bringing said dc signal to zero volts.

20. The monitor of claim 19 further including a second gain amplifier connected to said dc voltage source for boosting said dc signal to the volts range during valve monitoring.

21. The monitor of claim 20 further including a low pass filter connected to said second gain amplifier for eliminating unwanted electronic noise on said dc signal.

22. The monitor of claim 2 wherein at least one of said transmitter coil and said receiver coil is an insulated wire wrapped around said valve housing.

23. The monitor of claim 2 wherein at least one of said transmitter coil and said receiver coil is a plurality of wire segments wrapped at least once around said valve housing, and connected at their ends such that all of said wire segments become connected together in series when said connection is made.

24. The monitor of claim 2 wherein at least one of said transmitter coil and said receiver coil is a pancake coil.

25. The monitor of claim 2 wherein at least one of said transmitter coil and said receiver coil is an air core solenoid.

26. The monitor of claim 25 further including a plurality of ferromagnetic inserts within said core.

27. The monitor of claim 26 wherein said inserts are ferromagnetic rods.

28. The monitor of claim 27 wherein said ferromagnetic rods extend axially substantially beyond the coil portion of said solenoid.

29. The monitor of claim 2 wherein at least one of said transmitter coil and said receiver coil is a ferromagnetic core solenoid.

30. The monitor of claim 29 wherein said ferromagnetic core extends axially substantially beyond the coil portion of said solenoid.

31. The monitor of claim 2 wherein at least one of said transmitter coil and said receiver coil is an insulated wire wrapped around a bolt.

32. The monitor of claim 2 wherein at least one of said transmitter coil and said receiver coil is a ferrite core solenoid.

33. The monitor of claim 2 wherein said selected frequency is a sine wave or square wave of fixed discrete frequency.

34. The monitor of claim 2 wherein said selected frequency is a broadband noise signal.

35. The monitor of claim 2 wherein said at least one transmitter coil comprises two transmitter coils, and said signal generator provides voltage signals of the same frequency but opposite ac phase generation to said two transmitter coils.

36. The monitor of claim 35 wherein one of said ac phase generation signals is stronger than the other.

* * * * *